(12) United States Patent
Nishioka

(10) Patent No.: US 10,741,056 B2
(45) Date of Patent: Aug. 11, 2020

(54) TERMINAL DEVICE AND NOTIFICATION METHOD

(71) Applicant: JVC KENWOOD Corporation, Yokohama-shi, Kanagawa (JP)

(72) Inventor: Masamichi Nishioka, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 16/288,248

(22) Filed: Feb. 28, 2019

(65) Prior Publication Data

US 2019/0279495 A1    Sep. 12, 2019

(30) Foreign Application Priority Data

Mar. 7, 2018  (JP) ................. 2018-040977

(51) Int. Cl.
*G08B 29/02*  (2006.01)
*G08B 25/10*  (2006.01)
(Continued)

(52) U.S. Cl.
CPC ............ *G08B 25/10* (2013.01); *H04W 4/029* (2018.02); *H04W 4/90* (2018.02)

(58) Field of Classification Search
CPC .............. B22F 2999/00; B22F 2202/05; B22F 2202/06; B22F 3/115; B22F 9/082; B22F 2202/13; B22F 2009/0892; H04M 2250/04; H04M 1/67; H04M 1/7253; H04M 1/72569; H04M 1/72577; H04M 1/737; H04M 2250/02; H04M 2250/52; H04M 1/66; H04M 2250/14; H04M 1/00; H04M 1/72538; H04W 76/14; H04W 4/80; H04W 8/245; H04W 12/06; H04W 4/029; H04W 4/90; H04W 4/06; H04W 60/04; H04W 76/19; H04W 88/02; H04W 88/023; H04W 88/08; H04W 8/005; B60R 1/00; B60R 2022/4816; B60R 2022/4866; B66F 9/0755; B66F 9/186; G06F 16/51; G06F 16/5866; G06F 3/017; G06F 3/04815; G06F 3/0484; G06F 9/5072; G06F 1/163; G06F 21/36;
(Continued)

(56) References Cited

U.S. PATENT DOCUMENTS

2005/0225566 A1*  10/2005  Kojo .................. G06T 13/80
                                                           345/629
2009/0232130 A1*  9/2009  Philavong ............... H04L 65/40
                                                           370/352
(Continued)

FOREIGN PATENT DOCUMENTS

JP    2010268144 A    11/2010

*Primary Examiner* — Daniel Previl
(74) *Attorney, Agent, or Firm* — Brundidge & Stanger, P.C.

(57) ABSTRACT

In a terminal device, a receiver receives a plurality of signals from a plurality of other terminal devices. When the receiver has received a plurality of emergency signals, a setting unit sets priorities for a plurality of other terminal devices that are the transmission sources for the plurality of emergency signals. A notification unit gives notification of information regarding the plurality of other terminal devices that have transmitted the emergency signals, based on the priorities that have been set by the setting unit.

6 Claims, 15 Drawing Sheets

(51) Int. Cl.
*H04W 4/029* (2018.01)
*H04W 4/90* (2018.01)

(58) Field of Classification Search
CPC ...... G06F 3/016; G06F 3/0304; G06F 3/0346;
G06F 3/0481; G06F 3/0488; G06F
3/04883; G06F 3/16; G06F 3/165; G06F
7/4981; G06K 19/06028; G06K 2209/01;
G06K 2209/19; G06K 2209/27; G06K
9/00456; G06K 9/00476; G06K 9/00771;
G06K 9/033; G06K 9/18; G06K 9/22;
G06K 9/344; G06K 9/00013; G06K
19/06009; G06K 19/0707; G06K 1/126;
G06K 9/00248; G06K 9/00281; G06K
9/00604; G06K 9/0061; G06K 9/00912;
G06K 9/00919; G06K 9/036; G06Q
10/08; G06Q 10/087; G06Q 20/32; G06Q
20/3227; G06Q 20/363; G06Q 20/4014;
G06Q 20/20; G06Q 20/202; G06Q
20/206; G06Q 20/327; G06Q 20/353;
G06Q 20/36; G06Q 20/40; G06Q
20/40145; G06Q 30/0207; G06Q
30/0225; G06Q 30/0267; G06Q 30/0268;
G06Q 30/0601; G06Q 30/0635; G06T
2207/30252; G06T 7/00; G06T 11/00;
G06T 13/80; G06T 1/005; G06T
2201/0061; G06T 2201/0065; G06T
2207/10032; G06T 2207/30181; G06T
3/4053; G06T 5/006; G06T 7/33; G06T
7/35; H04N 5/2257; H04N 5/23212;
H04N 5/23229; H04N 5/23238; H04N
5/23232; H04N 5/23258; H04N 5/2353;
H04N 5/2356; H04N 5/272; H04N 7/18;
H04N 1/00103; H04N 1/00204; H04N
1/00244; H04N 1/00307; H04N 1/2112;
H04N 1/4058; H04N 2201/0075; H04N
2201/0084; H04N 2201/0094; H04N
3/08; H04N 5/232; H04N 5/23206; H04N
5/23219; H04N 5/2354; H04N 5/243;
H04N 5/44; H04N 5/76; H04N 5/772;
H04N 5/85; H04N 5/926; H04N 7/011;
H04N 7/142; H04N 7/185; G07C 5/008;
G07C 9/00087; G07C 5/0858; A63B
2024/009; A63B 2071/0644; A63B
24/0084; A63B 71/0622; A63B
2024/0093; A63B 2024/0096; A63B
2071/0625; A63B 2071/0636; A63B
2071/0675; A63B 2220/18; A63B
2220/20; A63B 2220/806; A63B
2220/807; A63B 2220/808; A63B
2225/20; A63B 2225/50; A63B 22/025;
A63B 22/0605; A63B 24/0059; A63B
24/0087; A63B 71/0619; B01J 2/02;
B60L 53/80; B60L 50/64; B60L 50/66;
B60L 53/66; B60L 58/12; C23C 4/123;
G01V 1/32; G01V 1/001; G01V 1/223;
G01V 1/24; G01V 1/305; G07F 7/0886;
G07F 19/20; G07F 19/207; G08B 7/068;
G08B 13/19632; G08B 15/001; G08B
25/00; G08B 25/04; G08B 25/10; G08G
1/054; G08G 5/0013; G08G 5/0034;
G08G 5/0039; G08G 5/0069; G08G
5/0082; G16H 20/30; H04L 63/083;
H04L 63/0861; H04L 29/06027; H04L
65/4038; H04L 65/4076; A61B 5/0015;
A61B 5/0022; A61B 5/0205; A61B
5/0245; A61B 5/1118; A61B 5/743; A61B
6/4417; A61B 6/503; A61B 8/08; A61K
51/0476; B41B 13/00; B41B 19/01;
B60K 1/04; B60K 2001/0472; B60S 5/06;
B60T 7/12; B61K 9/00; B61L 13/002;
B61L 25/025; B61L 25/04; B64C
2201/14; B64C 2201/143; B64C 39/024;
G01H 1/00; G01H 1/08; G01H 1/16;
G01M 11/0292; G01M 17/10; G01N
15/05; G01P 3/66; G01S 19/49; G01S
2013/935; G01S 2013/9353; G01S 5/02;
G01S 5/0263; G02B 27/0075; G02B
7/36; G02B 7/38; G03B 15/00; G03B
15/06; G03B 17/18; G03B 17/52; G03B
17/53; G03B 19/12; G03B 1/32; G03B
31/04; G03B 7/091
USPC ................ 340/506, 509, 511, 514, 516, 523,
340/538.15, 539.26, 568.1
See application file for complete search history.

(56) References Cited

U.S. PATENT DOCUMENTS

| 2016/0150282 | A1* | 5/2016 | Hirabayashi | H04N 21/47214 |
| | | | | 725/33 |
| 2017/0171734 | A1* | 6/2017 | Lee | H04M 1/72538 |
| 2017/0223712 | A1* | 8/2017 | Stephens | H04L 67/125 |

* cited by examiner

FIG.6

| DISTANCE | TERMINAL DEVICE | GROUP | NOTIFICATION OF EMERGENCY SIGNAL RECEPTION | RECORD-ING | NOTIFICATION OF INDIVIDUAL ID | NOTIFICATION OF GROUP ID | NOTIFICATION OF INFORMATION REGARDING POSITION |
|---|---|---|---|---|---|---|---|
| d≦Th11 | SECOND TERMINAL DEVICE 10b | A | YES | YES | YES | NO | YES |
| | SIXTH TERMINAL DEVICE 10f | B | YES | YES | YES | YES | YES |
| Th11<d≦Th21 | THIRD TERMINAL DEVICE 10c | A | YES | NO | YES | NO | YES |
| d>Th21 | FIFTH TERMINAL DEVICE 10e | B | NO | NO | NO | NO | NO |

FIG. 7

| DISTANCE | TERMINAL DEVICE | GROUP | NOTIFICATION OF EMERGENCY SIGNAL RECEPTION | RECORD-ING | NOTIFICATION OF INDIVIDUAL ID | NOTIFICATION OF GROUP ID | NOTIFICATION OF INFORMATION REGARDING POSITION |
|---|---|---|---|---|---|---|---|
| d≦Th12 | FIFTH TERMINAL DEVICE 10e | B | YES | YES | YES | NO | YES |
| Th12<d≦Th22 | THIRD TERMINAL DEVICE 10c | A | YES | NO | YES | YES | YES |
| | SECOND TERMINAL DEVICE 10b | A | NO | NO | NO | NO | NO |
| d>Th22 | SIXTH TERMINAL DEVICE 10f | B | YES | NO | YES | NO | NO |

FIG.9

| 1 | LMR11 | | NNW | ↖ | 1800m |
|---|---|---|---|---|---|
| | North "xx.xxx", East "xx.xxx" | | | | |
| 2 | LMR21 | Gr_B | ESE | ↘ | 2500m |
| | North "xx.xxx", East "xx.xxx" | | | | |

TERMINAL DEVICE AND NOTIFICATION METHOD

CROSS-REFERENCE TO RELATED APPLICATION

This application is based upon and claims the benefit of priority from the prior Japanese Patent Application No. 2018-040977, filed on Mar. 7, 2018, the entire contents of which are incorporated herein by reference.

BACKGROUND OF THE INVENTION

1. Field

The present invention relates to terminal devices that notify the reception of an emergency signal and to a notification method.

2. Description of the Related Art

A server is known that determines, when receiving a message in case of an emergency or the like, whether or not a wireless communication terminal that has sent the message belongs to an existing group and that creates, when the wireless communication terminal does not belong to any existing group, a group with wireless communication terminals located around the wireless communication terminal (see, for example, Patent Document 1). To wireless communication terminals belonging to a group, the server forwards messages sent from other wireless communication terminals (hereinafter referred to as terminal devices) including the wireless communication terminal that has sent the messages.

[Patent Document 1] Japanese Patent Application Publication No. 2010-268144

In the technology according to Patent Document 1, under a situation where communication is performed within a group that has been created in the event of an emergency, group reconstruction is performed so as to create a new group when another terminal device that does not belong to the group transmits an emergency message. In this case, there is a possibility that communication can no longer be continued with a terminal device that transmitted an emergency message in the first place and that the user thus cannot respond to the first emergency message.

SUMMARY OF THE INVENTION

A terminal device according to one aspect of the present embodiment is a terminal device including: a receiver that receives a plurality of signals from a plurality of other terminal devices; a setting unit that sets, when the receiver has received a plurality of emergency signals, priorities for a plurality of other terminal devices that are the transmission sources for the plurality of emergency signals; and a notification unit that gives notification of information regarding the plurality of other terminal devices that have transmitted the emergency signals, based on the priorities that have been set by the setting unit.

Another aspect of the present embodiment relates to a notification method. This method is a notification method in a terminal device, including: receiving a plurality of signals from a plurality of other terminal devices; setting, when having received a plurality of emergency signals in the receiving, priorities for a plurality of other terminal devices that are the transmission sources for the plurality of emergency signals; and giving notification of information regarding the plurality of other terminal devices that have transmitted the emergency signals, based on the priorities that have been set.

Optional combinations of the aforementioned constituting elements and implementations of embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 6 is a diagram illustrating the operation of a second terminal device, a third terminal device, a fifth terminal device, and a sixth terminal device when a first terminal device of FIG. 1 transmits an emergency signal;

FIG. 7 is a diagram illustrating the operation of the second terminal device, the third terminal device, the fifth terminal device, and the sixth terminal device when a fourth terminal device of FIG. 1 transmits an emergency signal;

FIG. 9 is a diagram illustrating an example of information displayed on a display unit of the third terminal device in a distance priority mode when respective emergency signals are received from the first terminal device and the fourth terminal device;

DETAILED DESCRIPTION OF THE PREFERRED EMBODIMENT

Figure 1:
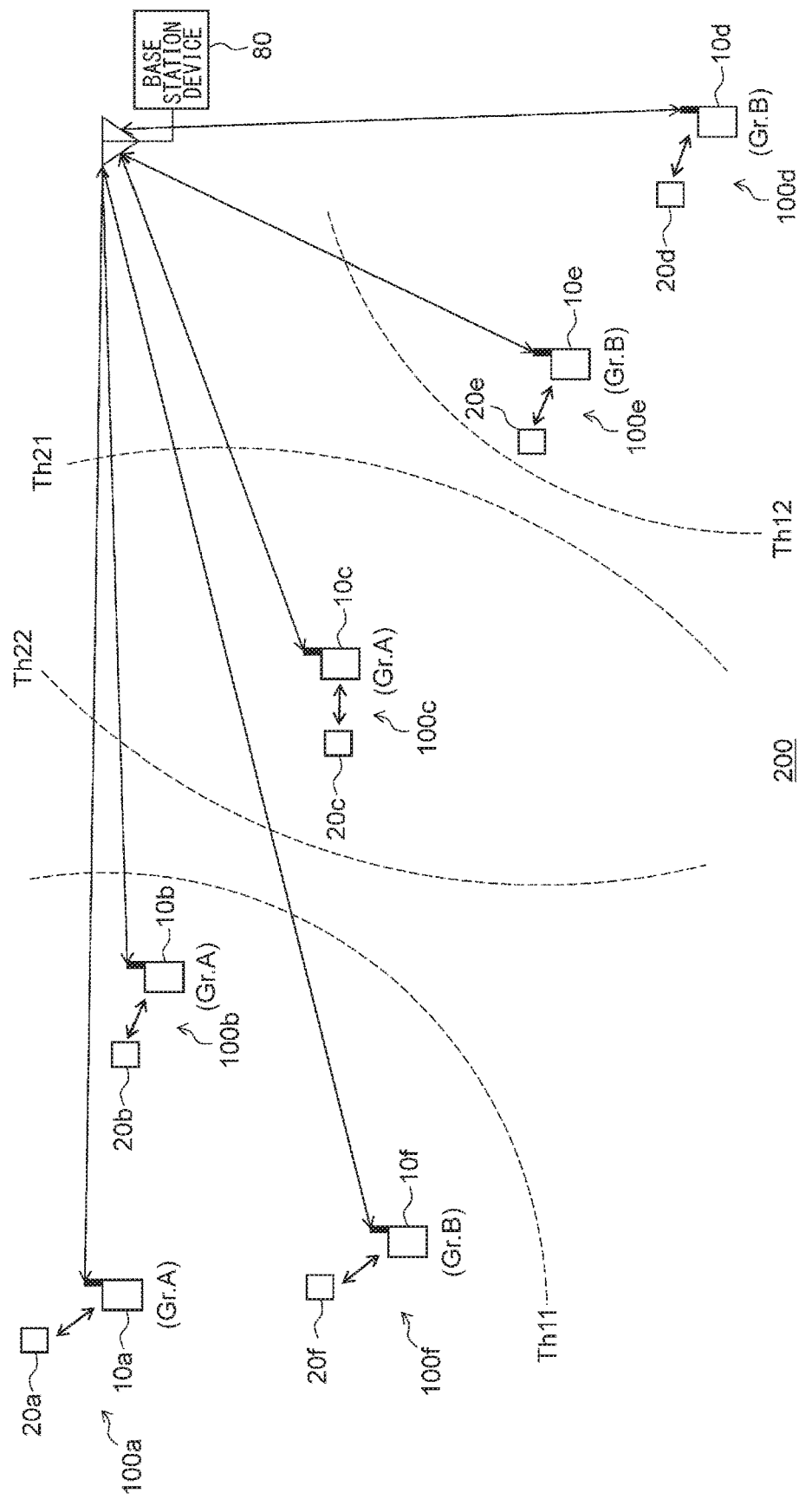
FIG. 1 is a diagram illustrating the configuration of a communication system according to an embodiment.

The invention will now be described by reference to the preferred embodiments. This does not intend to limit the scope of the present invention, but to exemplify the invention.

Before explaining an embodiment in detail, an overview will be given. The embodiment relates to a business wireless system including a plurality of terminal devices, a plurality of cameras, and a base station device. A terminal device and a camera that are a pair are connected to each other wirelessly or by wires and are paired. The paired terminal device and camera are mainly carried by a user such as a police officer and a security guard. The camera is also called a wearable camera and is worn by the user. In the camera, start and stop of recording are controlled by the paired terminal device.

In the business wireless system, a plurality of groups each including a plurality of terminal devices are formed. A base station device allocates an uplink channel and a downlink channel to the groups. In this kind of situation, one of the terminal devices in a group transmits a normal signal through the uplink channel, and the rest of the terminal devices in the group receive the normal signal through the downlink channel. The normal signal includes call data, etc. Further, the same process is performed on another group. However, communication of a normal signal is not performed between different groups.

A business wireless system is provided with an emergency reporting (emergency) function. This is a function where a terminal device conducts emergency reporting to another terminal device via the base station device when it is necessary to make contact urgently. Since the emergency reporting is transmitted as data, the transmission is completed in a short time and does not occupy the communication line. When a button for the emergency reporting is pressed down by the user, the terminal device transmits an emergency signal and causes the paired camera to start recording. Further, instead of using the button for emergency reporting, when the user collapses, the collapsing may be detected by a sensor built in the terminal device, and the recording may be started by the paired camera as well as transmitting an emergency signal. The user presses down the button for emergency reporting, e.g., when tracking a person to be tracked. Video that is recorded can be used as evidence etc. A terminal device in a standby state excluding the terminal device that is transmitting the emergency signal reports the occurrence of an emergency situation by sound or display when receiving the emergency signal. The user who is informed of the occurrence of the emergency situation can head to help the user who made the emergency reporting.

A situation can be considered where a plurality of users conduct emergency reporting. In this case, according to the respective distances to the users who made the emergency reporting and the respective groups of the terminal devices of the users who made the emergency reporting, other users preferably determine which user the other users should head to help or which user the other users should not head to help. In other words, as described above, it is desirable to properly notify the occurrence of an emergency situation when a plurality of terminal devices receive emergency reporting. Therefore, in the embodiment, priorities are set for a plurality of other terminal devices that are the transmission sources for a plurality of emergency signals, and information regarding the plurality of other terminal devices that have transmitted emergency signals is notified based on the set priorities.

FIG. 1 is a diagram illustrating the configuration of a communication system 200 according to the embodiment. The communication system 200 includes a first camera system 100a, a second camera system 100b, a third camera system 100c, a fourth camera system 100d, a fifth camera system 100e, and a sixth camera system 100f, which are generically referred to as camera systems 100. The number of the camera systems 100 is not limited to "6". Further, the communication system 200 includes a base station device 80.

The first camera system 100a includes a first terminal device 10a and a first camera 20a. The second camera system 100b includes a second terminal device 10b and a second camera 20b. The third camera system 100c includes a third terminal device 10c and a third camera 20c. The fourth camera system 100d includes a fourth terminal device 10d and a fourth camera 20d. The fifth camera system 100e includes a fifth terminal device 10e and a fifth camera 20e. The sixth camera system 100f includes a sixth terminal device 10f and a sixth camera 20f.

The first terminal device 10a, the second terminal device 10b, the third terminal device 10c, the fourth terminal device 10d, the fifth terminal device 10e, and the sixth terminal device 10f, are generically referred to as terminal devices 10. The first camera 20a, the second camera 20b, the third camera 20c, the fourth camera 20 d, the fifth camera 20e, and the sixth camera 20f are generically referred to as cameras 20.

The first terminal device 10a and the first camera 20a are paired and carried by the first user. The second terminal device 10b and the second camera 20b are paired and carried by the second user. The third terminal device 10c and the third camera 20c are paired and carried by the third user. The fourth terminal device 10d and the fourth camera 20d are paired and carried by the fourth user. The fifth terminal device 10e and the fifth camera 20e are paired and carried by the fifth user. The sixth terminal device 10f and the sixth camera 20f are paired and carried by the sixth user. As described, a terminal device 10 and a camera 20 carried by the same user are paired and connected wirelessly. A terminal device 10 and a camera 20 that are paired may be connected by wire.

The cameras 20 are capable of recording. In the camera 20, start and stop of recording are controlled by the user or by the paired terminal device 10.

FIG. 1 shows the positional relationship of a plurality of terminal devices 10. For example, the linear distance between the first terminal device 10a and the second terminal device 10b is shorter than the linear distance between the first terminal device 10a and the third terminal device 10c. The linear distance between the first terminal device 10a and the third terminal device 10c is shorter than the linear distance between the first terminal device 10a and the fourth terminal device 10d.

The first terminal device 10a, the second terminal device 10b, and the third terminal device 10c form a group. This group is called group A. The fourth terminal device 10d, the fifth terminal device 10e, and the sixth terminal device 10f form a group. This group is called group B. The number of terminal devices 10 included in one group is not limited to "3". The number of groups is not limited to "2". As described, the plurality of groups each include a plurality of terminal devices 10.

One terminal device 10 included in one of the plurality of groups is a wireless terminal capable of performing communication by business radio with the rest of the terminal devices 10 included in the group via the base station device 80. This communication may be a call or data communication. For the business radio, well-known techniques may be used, and a detailed description thereof will be therefore omitted.

The base station device 80 manages a plurality of terminal devices 10. The base station device 80 allocates an uplink channel and a downlink channel to each group. In this kind of situation, one of the terminal devices 10 in a group transmits a normal signal through the uplink channel, and the rest of the terminal devices 10 in the group receive the normal signal through the downlink channel.

Figure 2:
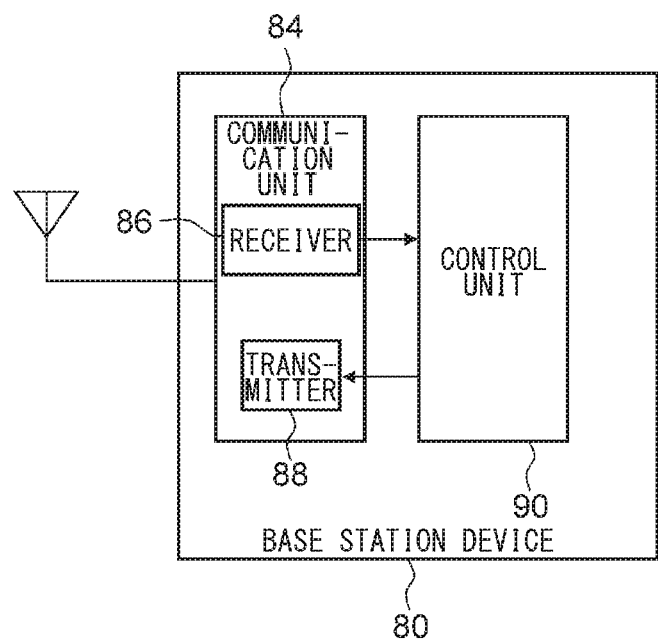
FIG. 2 is a block diagram illustrating the configuration of a base station device of FIG. 1.

FIG. 2 is a block diagram showing the configuration of the base station device 80 of FIG. 1. The base station device 80 includes a communication unit 84 and a control unit 90. The communication unit 84 includes a receiver 86 and a transmitter 88 and performs communication by the business radio with the plurality of terminal devices 10. The control unit 90 controls the communication unit 84.

The receiver 86 receives a normal signal from one terminal device 10 included in one of the plurality of groups through an uplink channel assigned to the group. When the receiver 86 has received the normal signal, the control unit 90 causes the transmitter 88 to transmit the normal signal. The transmitter 88 transmits the normal signal received by the receiver 86 to the rest of the terminal devices 10 included in the group through the downlink channel assigned to the group.

Figures 3A, 3B:
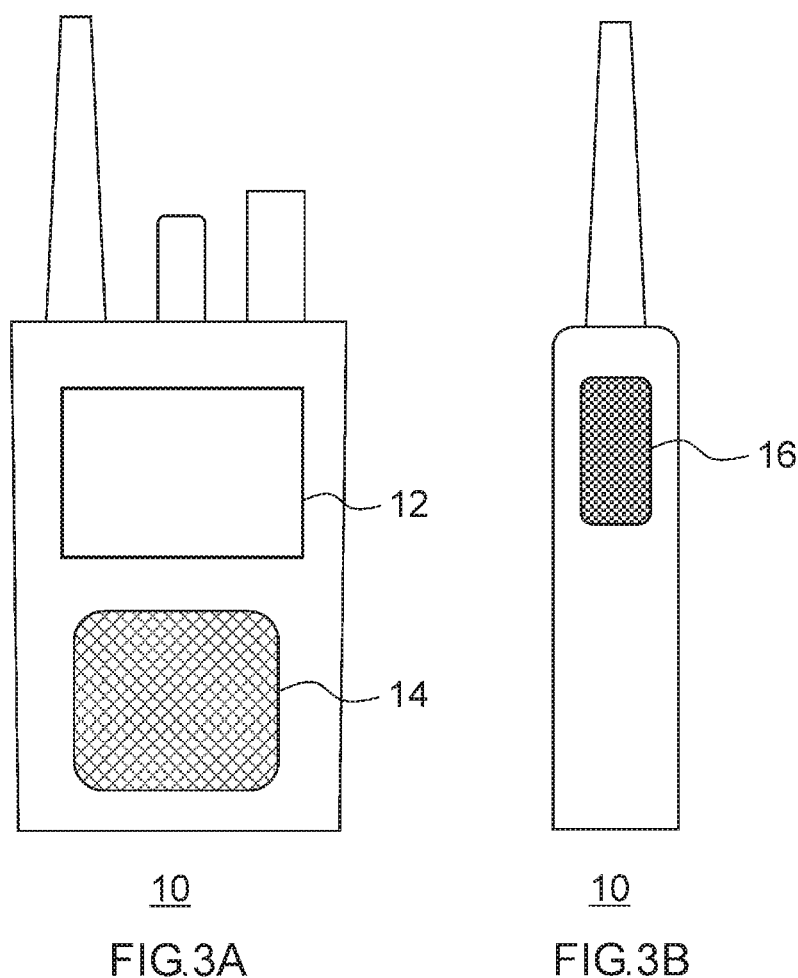
FIG. 3A is a front view of a terminal device of FIG. 1.
FIG. 3B is a lateral view of the terminal device of FIG. 1.

FIG. 3A is a front view of the terminal device 10 of FIG. 1, and FIG. 3B is a lateral view of the terminal device 10 of FIG. 1. The terminal device 10 includes a display unit 12 and a speaker 14 on the front side and an emergency button 16 for reporting an emergency on a side surface. The display unit 12 displays various types of information. The speaker 14 outputs sound, notification sound, and the like. The emergency button 16 is pressed down by the user when an emergency situation occurs and is pressed down again when the emergency situation has ended. Further, instead of using the emergency button 16, when the user collapses, the collapsing may be detected by a sensor built in the terminal device 10, an emergency signal may be transmitted, and the recording may be started by a camera 20 that has been paired, as well. The appearance of the terminal device 10 is not limited to the example in FIGS. 3A and 3B.

Figure 4:
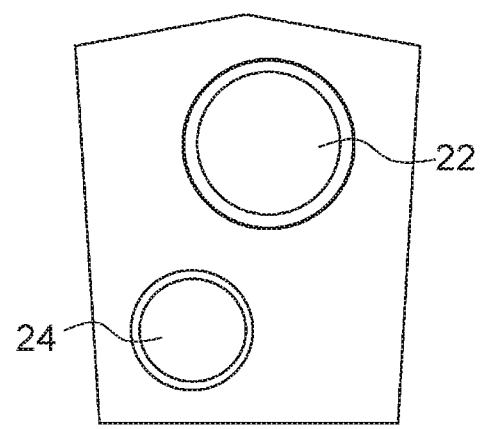
FIG. 4 is a front view of a camera of FIG. 1.

FIG. 4 is a front view of the camera 20 of FIG. 1. The camera 20 includes a lens 22 and a recording button 24 on the front. The lens 22 allows image light to be incident on an image capturing unit, which will be described later. The recording button 24 is used for manual operation and is pressed down by the user when starting the recording and pressed down again when stopping the recording. The appearance of the camera 20 is not limited to the example in FIG. 4.

Figure 5:
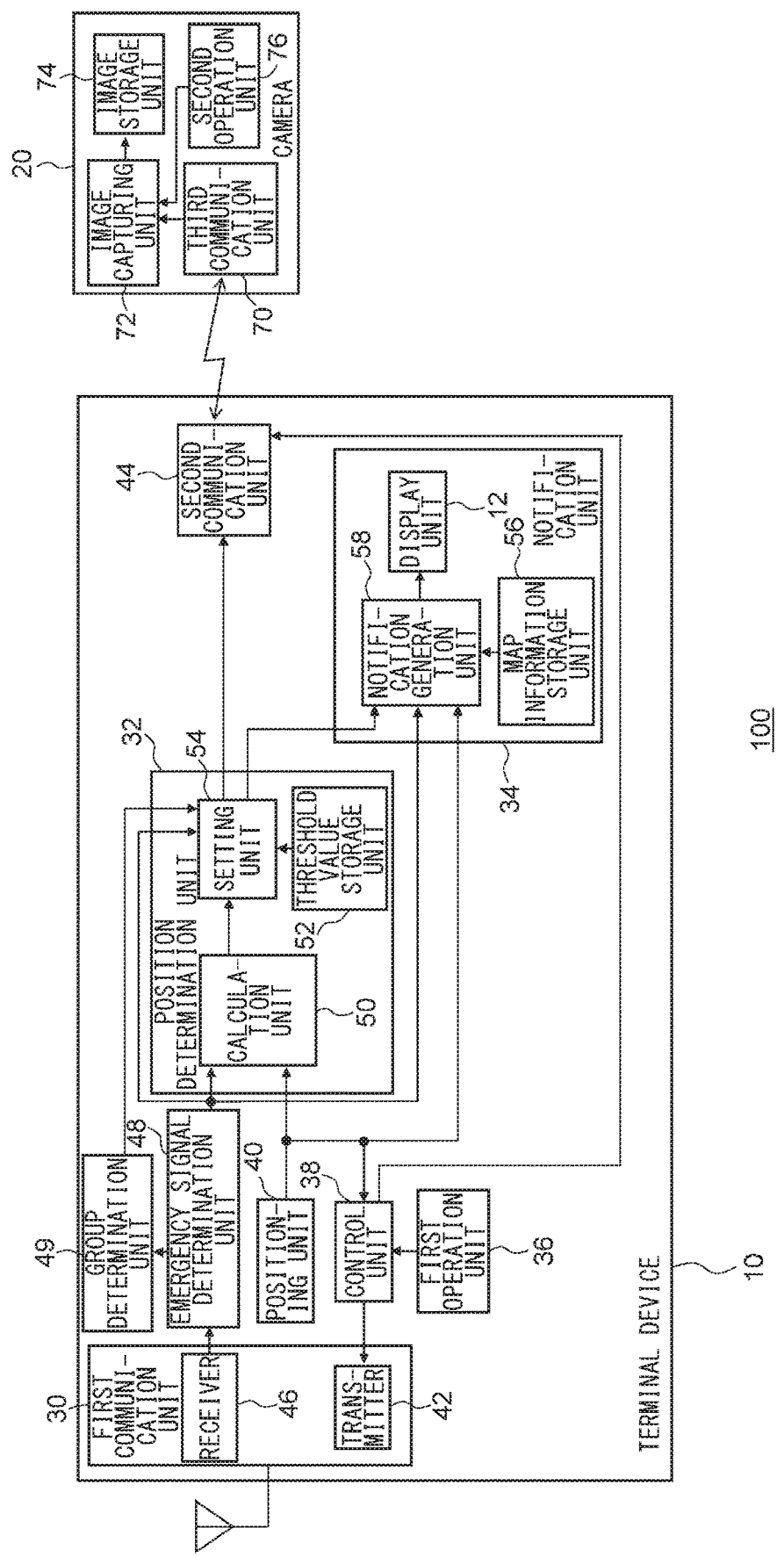
FIG. 5 is a block diagram illustrating the configuration of a camera system of FIG. 1.

FIG. 5 is a block diagram illustrating the configuration of a camera system 100 of FIG. 1. The terminal device 10 includes a first communication unit 30, a position determination unit 32, a notification unit 34, a first operation unit 36, a control unit 38, a positioning unit 40, a second communication unit 44, an emergency signal determination unit 48, and a group determination unit 49. The first communication unit 30 includes a transmitter 42 and a receiver 46 and performs communication by business radio. The position determination unit 32 includes a calculation unit 50, a threshold value storage unit 52, and a setting unit 54. The notification unit 34 includes a display unit 12, a map information storage unit 56, and a notification generation unit 58. In order to clarify the explanation, the configuration related to the call in the terminal device 10 is not shown. The camera 20 includes a third communication unit 70, an image capturing unit 72, an image storage unit 74, and a second operation unit 76. The first terminal device 10*a* through the sixth terminal device 10*f* shown in FIG. 1 share the same configuration, and the first camera 20*a* through the sixth camera 20*f* share the same configuration.

In order to clarify the explanation, an explanation will be given in the following order in accordance with processes performed at the time of reporting an emergency: (1) processes by the terminal device 10 for transmitting the emergency signal, (2) processes by the base station device 80, and (3) processes by the terminal device 10 for receiving the emergency signal.

(1) Processes by the Terminal Device 10 for Transmitting the Emergency Signal An example will be explained where each of the first terminal device 10*a* and the fourth terminal device 10*d* in FIG. 1 transmits an emergency signal. One terminal device 10 may transmit an emergency signal. Alternatively, three or more terminal devices 10 may each transmit an emergency signal. In FIG. 5, the first operation unit 36 includes the emergency button 16 in FIG. 3 and outputs an instruction to report an emergency to the control unit 38 when the emergency button 16 is pressed down. This instruction to report an emergency is valid until the emergency button 16 is pressed down next time.

The positioning unit 40 has a positioning function of a global positioning system (GPS), measures the position of the terminal device 10, and regularly acquires position information, which is the result of the measurement of the position. The position information is indicated by latitude and longitude. The position information may include altitude information. The positioning unit 40 outputs the position information to the control unit 38, the calculation unit 50, and the notification generation unit 58.

When an instruction to report an emergency is output from the first operation unit 36, the control unit 38 causes the transmitter 42 to transmit an emergency signal, the position information of the terminal device 10, the individual ID of the terminal device 10, and the group ID of the terminal device 10 to the base station device 80. In other words, the terminal device 10 transmits the emergency signal, the position information, the individual ID, and the group ID to the base station device 80. The individual ID corresponds to identification information for identifying the terminal device 10 that is the transmission source for the emergency signal. The group ID corresponds to the group-based information indicating the group in which the terminal device 10 that is the transmission source for the emergency signal is included. The emergency signal or the like is transmitted through the uplink channel assigned to the group of the terminal device 10. The emergency signal or the like may be transmitted through the same channel as the uplink channel used for a call or may be transmitted through a different channel.

When the outputting of the instruction to report an emergency from the first operation unit 36 is stopped, the control unit 38 causes the transmitter 42 to stop transmitting the emergency signal, the position information, the individual ID, and the group ID. After the emergency button 16 is pressed down, the emergency signal, the individual ID, and the group ID are continuously transmitted and the position information is periodically transmitted until the emergency button 16 is pressed down again. The position information may be periodically transmitted irrespective of any operation on the emergency button 16.

Further, when an instruction to report an emergency is output from the first operation unit 36, the control unit 38 causes the paired camera 20 to start recording. Specifically, the control unit 38 outputs an instruction to start recording to the second communication unit 44. The second communication unit 44 transmits the instruction to start recording to the third communication unit 70 of the camera 20. The second communication unit 44 and the third communication unit 70 perform short-range wireless communication, for example, Bluetooth (registered trademark) communication. The third communication unit 70 outputs an instruction to record to the image capturing unit 72. The image capturing unit 72 captures a moving image in accordance with the instruction to record and outputs captured image data to the image storage unit 74. The image storage unit 74 stores the captured image data. When the outputting of the instruction to report an emergency from the first operation unit 36 is stopped, the control unit 38 stops the outputting of the instruction to record and causes the paired camera 20 to stop recording.

(2) Processes by the Base Station Device 80

In the base station device 80 in FIG. 2, the receiver 86 receives the emergency signal, the position information, the individual ID, and the group ID from the terminal device 10, that is, each of the first terminal device 10a and the fourth terminal device 10d in FIG. 1. When the receiver 86 has received an emergency signal or the like, the control unit 90 causes the transmitter 88 to transmit the emergency signal or the like.

When the receiver 86 receives an emergency signal, position information, an individual ID, and a group ID from one terminal device 10 included in one group, the transmitter 88 transmits the emergency signal, the position information, the individual ID, and the group ID received by the receiver 86 to the rest of the terminal devices 10 included in the group and terminal devices 10 other than those in the group while maintaining the groups. That is, without changing the existing group, the transmitter 88 transmits the emergency signal or the like to terminal devices 10 other than the terminal device 10 that is the transmission source for the emergency signal, among the plurality of terminal devices 10 in the coverage area of the base station device 80. In the example of FIG. 1, the transmitter 88 transmits the emergency signal or the like received from the first terminal device 10a and the emergency signal or the like received from the fourth terminal device 10d to the second terminal device 10b, the third terminal device 10c, the fifth terminal device 10e, and the sixth terminal device 10f, while maintaining the group A and the group B. The emergency signal or the like is transmitted through the downlink channel assigned to each group. The emergency signal or the like may be transmitted through the same channel as the downlink channel used for a call or may be transmitted through a different channel.

Since the groups are maintained, even when the receiver 86 receives, while the terminal device 10 is transmitting an emergency signal, a normal signal from one terminal device 10 included in one group, the transmitter 88 can transmit the normal signal received by the receiver 86 to the rest of the terminal devices 10 included in the group. Therefore, even when the terminal device 10 is in the middle of transmitting the emergency signal, group communication can be performed using the same groups as those before the transmission of the emergency signal.

(3) Processes by the Terminal Device 10 for Receiving the Emergency Signal

The terminal device 10 corresponds to each of the second terminal device 10b, the third terminal device 10c, the fifth terminal device 10e, and the sixth terminal device 10f in FIG. 1, and the camera 20 corresponds to each of the second camera 20b, the third camera 20c, the fifth camera 20e, and the sixth camera 20f.

In FIG. 5, the receiver 46 receives respective reception signals from other terminal devices 10 via the base station device 80 through the downlink channel assigned to the group of the present terminal device 10. Here, the "other terminal devices" means the first terminal device 10a and the fourth terminal device 10d, which are the transmission sources for the emergency signals. The reception signal includes the emergency signal, the position information of the other terminal device 10, the individual ID of the other terminal device 10, and the group ID of the other terminal device 10. In other words, the receiver 46 receives a plurality of emergency signals from a plurality of other terminal devices 10. The receiver 46 outputs the reception signals to the emergency signal determination unit 48.

The emergency signal determination unit 48 determines whether or not the emergency signals have been received based on the reception signals. When the emergency signals are received, the emergency signal determination unit 48 outputs information indicating that the emergency signals have been received and the respective pieces of position information and individual IDs of the other terminal devices 10 included in the reception signals to the calculation unit 50 and the notification generation unit 58. When the emergency signals are received, the emergency signal determination unit 48 outputs the respective group IDs of the other terminal devices 10 included in the reception signals to the group determination unit 49. When the emergency signals are received, the emergency signal determination unit 48 outputs information regarding the respective times at which the emergency signals have been received to the setting unit 54. When the emergency signals are not received, the emergency signal determination unit 48 does not output such information.

Based on the group IDs output from the emergency signal determination unit 48, the group determination unit 49 determines whether or not the respective groups of the other terminal devices 10 are the same as the group of the present terminal device 10. The group determination unit 49 outputs the determination result and the group IDs to the setting unit 54.

The positioning unit 40 measures the position of the present terminal device 10 and regularly acquires position information, which is the result of the measurement of the position. The positioning unit 40 outputs the position information to the control unit 38, the calculation unit 50, and the notification generation unit 58.

When the receiver 46 receives the emergency signals, the calculation unit 50 calculates the respective distances d between the present terminal device 10 and the other terminal devices 10 based on the position information of the present terminal device 10 and the respective pieces of position information of the other terminal devices 10. The calculation unit 50 outputs the respective individual IDs of the other terminal devices 10 and the distances d to the setting unit 54. The distances d are straight line distances and can be calculated using, for example, the Pythagorean theorem. In the case of using the Pythagorean theorem, position coordinates (a, b) are derived from the respective pieces of position information of the other terminal devices 10, position coordinates (c, d) are derived from the position information of the present terminal device 10, and the calculation is performed as follows: $d=\sqrt{[(c-a)^2+(d-b)^2]}$.

The threshold value storage unit 52 is composed of a memory or the like and stores predetermined recording start threshold values Th11 and Th12 and predetermined notification threshold values Th21 and Th22 in FIG. 1. The recording start threshold value Th11 and the notification threshold value Th21 are used for an emergency signal transmitted from a terminal device 10 in the group A. The recording start threshold value Th12 and the notification threshold value Th22 are used for an emergency signal transmitted from a terminal device 10 in the group B. The notification threshold value Th21 is larger than the recording start threshold value Th11. The notification threshold value Th22 is larger than the recording start threshold value Th12. The recording start threshold values Th11 and Th12 and the notification threshold values Th21 and Th22 are preset by computer simulation, experiment, or the like. A common recording start threshold value and a common notification threshold value may be used regardless of the group of a terminal device 10 that is the transmission source of an emergency signal.

In the example in FIG. 1, the distance d between the first terminal device 10a and the second terminal device 10b and the distance d between the first terminal device 10a and the sixth terminal device 10f are smaller than the recording start threshold value Th11. The distance d between the first terminal device 10a and the third terminal device 10c is larger than the recording start threshold value Th11 and smaller than the notification threshold value Th21. The distance d between the first terminal device 10a and the fifth terminal device 10e is larger than the notification threshold value Th21.

The distance d between the fourth terminal device 10d and the fifth terminal device 10e is smaller than the recording start threshold value Th12. The distance d between the fourth terminal device 10d and the third terminal device 10c is larger than the recording start threshold value Th12 and smaller than the notification threshold value Th22. The distance d between the fourth terminal device 10d and the second terminal device 10b and the distance d between the fourth terminal device 10d and the sixth terminal device 10f are larger than the notification threshold value Th22.

Regarding the reception of an emergency signal from another terminal device 10 in the group A, the setting unit 54 compares the distance d between the present terminal device 10 and the other terminal device 10 calculated by the calculation unit 50, the recording start threshold value Th11, and the notification threshold value Th21 with one another.

Regarding the reception of an emergency signal from another terminal device 10 in the group B, the setting unit 54 compares the distance d between the present terminal device 10 and the other terminal device 10 calculated by the calculation unit 50, the recording start threshold value Th12, and the notification threshold value Th22 with one another.

As shown in FIGS. 6 and 7, the present terminal device 10 operates in accordance with the comparison result by the setting unit 54 and whether or not the group of other terminal device 10 is the same as the group of the present terminal device 10.

FIG. 6 is a diagram illustrating the operation of the second terminal device 10b, the third terminal device 10c, the fifth terminal device 10e, and the sixth terminal device 10f when the first terminal device 10a of FIG. 1 transmits an emergency signal. FIG. 7 is a diagram illustrating the operation of the second terminal device 10b, the third terminal device 10c, the fifth terminal device 10e, and the sixth terminal device 10f when the fourth terminal device 10d of FIG. 1 transmits an emergency signal. Hereinafter, an explanation will be made with reference to FIGS. 6 and 7 as appropriate.

When the receiver 46 has received an emergency signal from one or a plurality of other terminal devices 10, the setting unit 54 make the following settings for each of the other terminal devices 10.

When the group of another terminal device 10 is the same as the group of the present terminal device 10 and the distance d is larger than the notification threshold value, the setting unit 54 sets to notify the reception of an emergency signal, sets to notify the individual ID, sets not to notify information regarding the position of the other terminal device 10, and sets not to perform recording.

When the group of the other terminal device 10 is the same as the group of the present terminal device 10 and the distance d is larger than the recording start threshold value and is less than or equal to the notification threshold value, the setting unit 54 sets to notify the reception of the emergency signal, sets to notify the individual ID, sets to notify the information regarding the position of the other terminal device 10, and sets not to perform recording.

When the group of the other terminal device 10 is the same as the group of the present terminal device 10 and the distance d is less than or equal to the recording start threshold value, the setting unit 54 sets to notify the reception of the emergency signal, sets to notify the individual ID, sets to notify the information regarding the position of the other terminal device 10, and sets to start recording.

When the group of the other terminal device 10 is different from the group of the present terminal device 10 and the distance d is larger than the notification threshold value, the setting unit 54 sets not to notify the reception of the emergency signal, sets not to notify the individual ID and the group ID, sets not to notify the information regarding the position of the other terminal device 10, and sets not to perform recording.

When the group of the other terminal device 10 is different from the group of the present terminal device 10 and the distance d is larger than the recording start threshold value and is less than or equal to the notification threshold value, the setting unit 54 sets to notify the reception of the emergency signal, sets to notify the individual ID and the group ID, sets to notify the information regarding the position of the other terminal device 10, and sets not to perform recording.

When the group of the other terminal device 10 is different from the group of the present terminal device 10 and the distance d is less than or equal to the recording start threshold value, the setting unit 54 sets to notify the reception of the emergency signal, sets to notify the individual ID and the group ID, sets to notify the information regarding the position of the other terminal device 10, and sets to start recording.

In other words, when the receiver 46 receives an emergency signal from one or a plurality of other terminal devices 10, the setting unit 54 sets to notify the reception of an emergency signal and to notify the individual ID that are related to one or a plurality of other terminal devices 10 whose relationship with the present terminal device 10 satisfies a predetermined notification condition. The notification condition is as follows: (1) the group of the other terminal device 10 is the same as the group of the present terminal device 10 or (2) the group of the other terminal device 10 is different from the group of the present terminal device 10 and the distance d between the other terminal device 10 and the present terminal device 10 is equal to or less than the notification threshold value.

When the setting unit 54 sets to notify the reception of the emergency signal, if the group of the other terminal device 10 is different from the group of the present terminal device 10, the setting unit 54 sets to notify the group of the other terminal device 10. When the receiver 46 receives the emergency signal and the distance d is equal to or less than the notification threshold value, the setting unit 54 sets to notify the information regarding the position of the other terminal device 10, regardless of the group of the other terminal device 10. When the receiver 46 receives the emergency signal and the distance d is equal to or less than the recording start threshold value, the setting unit 54 sets to start recording, regardless of the group of the other terminal device 10.

For each other terminal device 10, the setting unit 54 keeps the setting to notify or not to notify each piece of information regarding the other terminal device 10 and the setting to start or not to perform recording.

When the receiver has received a plurality of emergency signals, the setting unit 54 sets priorities for a plurality of other terminal devices 10 that are the transmission sources for the emergency signals. When the receiver 46 receives an emergency signal from another terminal device 10, the setting unit 54 sets the highest priority to the other terminal device 10.

The terminal devices 10 can set either one of a group priority mode and a distance priority mode. The method of setting priorities differs between the group priority mode and the distance priority mode. The same mode may be set for terminal devices 10 of the same group. Alternatively, an arbitrary mode may be set regardless of the group.

(Group Priority Mode)

In the case of the group priority mode, the setting unit 54 sets the priority for another terminal device 10 in the same group as that of the present terminal device 10 to be higher than the priority for another terminal device 10 in a group different from that of the present terminal device 10, based on group-based information received by the receiver 46.

In a case where a plurality of other terminal devices 10 are included in the same group as that of the present terminal device 10, the setting unit 54 sets priorities for the plurality of other terminal devices 10 in the same group as that of the present terminal device 10, based on the distances calculated by the calculation unit 50. In a case where a plurality of other terminal devices 10 are included in a group different from that of the present terminal device 10, the setting unit 54 sets priorities for the plurality of other terminal devices 10 in the group different from that of the present terminal device 10, based on the distances.

Among a plurality of other terminal devices 10 in a group that is the same as that of the present terminal device 10, the setting unit 54 sets priorities for other terminal devices 10 whose respective distances are within a predetermined first distance range to be higher than the priorities for other terminal devices 10 whose respective distances are within a second distance range, and the second distance range is located farther than the first distance range.

Among the plurality of other terminal devices 10 in a group that is the same as that of the present terminal device 10, the setting unit 54 sets priorities for other terminal devices 10 whose respective distance are within the second distance range to be higher than the priorities for other terminal devices 10 whose respective distances are within a third distance range, and the third distance range is located farther than the second distance range. The priorities for a plurality of other terminal devices 10 in a group different from that of the present terminal device 10 are set in the same manner.

The first distance range is a range of less than or equal to the recording start threshold value. The second distance range is a range that is larger than the recording start threshold value and is less than or equal to the notification threshold value. The third distance range is a range that is larger than the notification threshold value. The first distance range, the second distance range, and the third distance range differ according to the group of the other terminal devices 10. When a common recording start threshold value and a common notification threshold value are used regardless of the group, the first distance range, the second distance range, and the third distance range are also used in common.

When a plurality of other terminal devices 10 are included in one distance range in one group, the setting unit 54 sets priorities for the plurality of other terminal devices 10 based on the respective times at which the receiver 46 receives a plurality of emergency signals from the plurality of other terminal devices 10. The later the time at which the receiver 46 receives an emergency signal, the higher the priority the setting unit 54 sets.

(Distance Priority Mode)

In the distance priority mode, the setting unit 54 sets priorities for the plurality of other terminal devices 10 based on the distance calculated by the calculation unit 50. More specifically, the setting unit 54 sets priorities for other terminal devices 10 whose respective distances are within the first distance range to be higher than the priorities for other terminal devices 10 whose respective distances are within the second distance range. The setting unit 54 sets priorities for the other terminal devices 10 whose respective distances are within the second distance range to be higher than the priorities for other terminal devices 10 whose respective distances are within the third distance range.

When a plurality of other terminal devices 10 are included in a single distance range, the setting unit 54 sets the priorities for the plurality of other terminal devices 10 whose respective distances are within the single distance range based on the group-based information. More specifically, in the plurality of other terminal devices 10 whose respective distances are within one distance range, the setting unit 54 sets the priorities for other terminal devices 10 in the same group as that of the present terminal device 10 to be higher than the priorities for other terminal devices 10 in a group different from that of the present terminal device 10.

When a plurality of other terminal devices 10 are included in one group in one distance range, the setting unit 54 sets priorities for the plurality of other terminal devices 10 based on the respective times at which the receiver 46 receives a plurality of emergency signals from the plurality of other terminal devices 10. The later the time at which the receiver 46 receives an emergency signal, the higher the priority the setting unit 54 sets.

Upon setting the priorities, the setting unit 54 provides to the notification unit 34 an instruction to notify the information that has been set to be notified along with the priorities. When the instruction to notify is provided from the setting unit 54, the notification unit 34 assigns priorities to the plurality of other terminal devices 10 that have transmitted the emergency signals based on the priorities set by the setting unit 54, and notifies the user of the information according to the instruction to notify.

When the reception of an emergency signal and the instruction to notify the individual ID is provided from the setting unit 54, the notification unit 34 assigns priorities that have been set by the setting unit 54 and notifies the user of the information for identifying one or a plurality of other terminal devices 10 and the reception of one or a plurality of emergency signals. The information for identifying the other terminal device(s) 10 can be also referred to as information of the other terminal device(s) 10. As shown in FIGS. 6 and 7, in the second terminal device 10b, the reception of an emergency signal related to the first terminal device 10a is notified. In the third terminal device 10c and the sixth terminal device 10f, the reception of emergency signals related to both the first terminal device 10a and the fourth terminal device 10d is notified. In the fifth terminal device 10e, the reception of an emergency signal related to the fourth terminal device 10d is notified.

When a setting for notifying the group ID is provided from the setting unit 54, the notification unit 34 assigns priorities that have been set by the setting unit 54 and notifies the user of the Group ID of the one or plurality of other terminal devices 10. In other words, in the case where the notification unit 34 gives notification of the reception of the emergency signal, when the group of the other terminal device 10 is different from the group of the present terminal device 10, the notification unit 34 gives notification of the group of the other terminal device 10. As shown in FIG. 7, in the third terminal device 10c, a group is notified with regard to the fourth terminal device 10d. As shown in FIG. 6, in the sixth terminal device 10f, a group is notified with regard to the first terminal device 10a.

When a setting for notifying the information regarding the position of the other terminal device 10 is provided from the setting unit 54, the notification unit 34 assigns priorities that have been set by the setting unit 54 and notifies the user of the information regarding the position of the one or plurality of other terminal devices 10. The notification unit 34 generates information regarding the position of the other terminal device 10 based on the position information of the present terminal device 10 and the position information of the other terminal device 10. The information regarding the position of the other terminal device 10 includes, for example, the latitude and longitude of the other terminal device 10, the distance d, the direction of the other terminal device 10, the altitude difference from the other terminal device 10, and a path to the other terminal device 10. As shown in FIG. 6, the notification of the information regarding the position of the first terminal device 10a is made by the second terminal device 10b, the third terminal device 10c, and the sixth terminal device 10f. As shown in FIG. 7, the notification of the information regarding the position of the fourth terminal device 10d is made by the third terminal device 10c and the fifth terminal device 10e.

When the setting to start recording with regard to the other terminal device 10 with the highest priority is made, the setting unit 54 outputs to the second communication unit 44 an instruction to record. When the setting to start recording with regard to other terminal devices 10 other than the one with the highest priority is made, the setting unit 54 does not execute this setting to start recording and does not output an instruction to record.

The second communication unit 44 transmits the instruction to record that has been provided from the setting unit 54, to the third communication unit 70 of the camera 20. The third communication unit 70 outputs an instruction to record to the image capturing unit 72. The image capturing unit 72 captures a moving image in accordance with the instruction to record and outputs captured image data to the image storage unit 74. The image storage unit 74 stores the captured image data. Such operation is performed by the second terminal device 10b and the second camera 20b as shown in FIG. 6 and by the fifth terminal device 10e and the fifth camera 20e as shown in FIG. 7. In the sixth terminal device 10f and the sixth camera 20f shown in FIG. 6, such operation is performed when the priority of the first terminal device 10a is set to be the highest.

When the setting unit 54 has caused the camera 20 to start recording, the setting unit 54 maintains the priority for the other terminal device 10 that has triggered the start of the recording to be the highest even when the receiver 46 receives a new emergency signal.

For example, the notification unit 34 notifies the reception of an emergency signal as follows. The map information storage unit 56 stores map information. The notification generation unit 58 generates map data based on the map information stored in the map information storage unit 56, the position information of the present terminal device 10, and the position information of the other terminal device 10 with the highest priority. The map data includes a path from the position of the present terminal device 10 to the position of the other terminal device 10 with the highest priority. With regard to each other terminal device 10, the map data also includes the priority, distance, and direction of the other terminal device 10, an altitude difference from the other terminal device 10, information identifying the other terminal device 10, and information regarding the group of the other terminal device 10. The notification generation unit 58 generates information for identifying the other terminal device 10 based on the individual ID and generates information regarding the group of the other terminal device 10 based on the group ID. The information for identifying the other terminal device 10 may be the same as the individual ID. The information regarding the group of the other terminal device 10 may be the same as the group ID. The notification generation unit 58 outputs the map data that has been generated to the display unit 12. The display unit 12 displays a map in which various types of information are included based on the map data.

Instead of displaying the map, for each other terminal device 10, the notification unit 34 may display the direction of the other terminal device 10 on the display unit 12 using arrows and letters and display the priority, position, and distance of the other terminal device 10, the information for identifying the other terminal device 10, and the information regarding the group of the other terminal device 10 on the display unit 12 using letters. Further, the notification unit 34 may cause the speaker 14 to output these pieces of information by voice.

Figure 8:
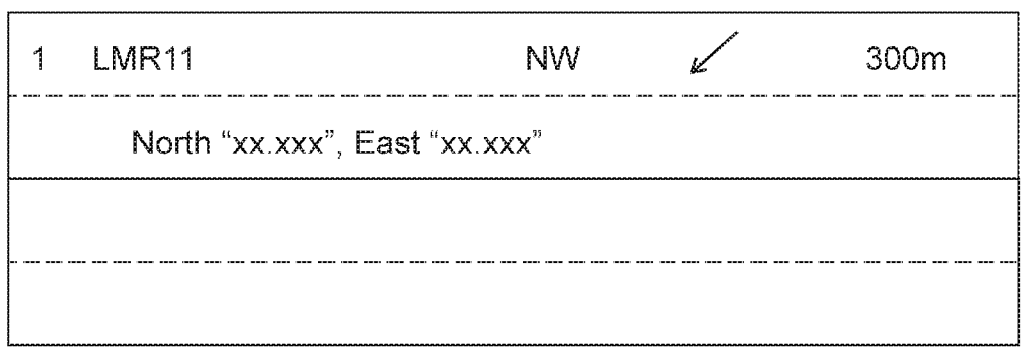
FIG. 8 is a diagram illustrating an example of information displayed on a display unit of the second terminal device in a group priority mode when respective emergency signals are received from the first terminal device and the fourth terminal device.

FIG. 8 is a diagram illustrating an example of information displayed on the display unit 12 of the second terminal device 10b in the group priority mode when an emergency signal is received from the first terminal device 10a and the fourth terminal device 10d. The display unit 12 displays the letter "1" indicating the priority, the letters "LMR11" being information for identifying the first terminal device 10a, the letters "NW" indicating the direction (cardinal direction) of the first terminal device 10a, the arrow indicating the direction of the first terminal device 10a, and the letters "300m" indicating the distance. The display unit 12 also displays the letters 'North "xx.xxx", East "xx.xxx"' indicating the position of the first terminal device 10a, that is, the latitude and the longitude.

FIG. 9 is a diagram illustrating an example of information displayed on the display unit 12 of the third terminal device 10c in the distance priority mode when an emergency signal is received from the first terminal device 10a and the fourth terminal device 10d. Regarding the first terminal device 10a, the display unit 12 displays the letter "1" indicating the priority, the letters "LMR11" being information for identifying the first terminal device 10a, the letters "NNW" indicating the direction (cardinal direction) of the first terminal device 10a, the arrow indicating the direction of the first terminal device 10a, and the letters "1800m" indicating the distance. The display unit 12 also displays the letters indicating the latitude and longitude of the first terminal device 10a.

Regarding the fourth terminal device 10d, the display unit 12 displays the letter "2" indicating the priority, the letters "LMR21" being information for identifying the fourth terminal device 10d, the letters "Gr_B" being information regarding the group of the fourth terminal device 10d, the letters "ESE" indicating the direction (cardinal direction) of the fourth terminal device 10d, the arrow indicating the direction of the fourth terminal device 10d, and the letters "2500m" indicating the distance. The display unit 12 also displays the letters indicating the latitude and longitude of the fourth terminal device 10d.

FIG. 5 is referred back. When the receiver 46 has not received the emergency signal, the notification unit 34 does not notify the information for identifying the other terminal device 10, the information regarding the group of the other terminal device 10, and the reception of the emergency signal. Further, when the receiver 46 has not received the emergency signal, the setting unit 54 stops the outputting of the instruction to record such that the camera 20 does not perform the recording and stops the outputting of the instruction to notify the position such that the notification unit 34 does not notify the information regarding the position of the other terminal device 10.

If the recording button 24 of FIG. 4 included in the second operation unit 76 of the camera 20 is pressed down by the user when the terminal device 10 is not transmitting or receiving an emergency signal, the image capturing unit 72 captures a moving image, and the image storage unit 74 stores the captured image data. In other words, the recording can be also done manually.

The configuration is implemented in hardware by any CPU of a computer, memory or other LSI's, and in software by a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

Figure 10:
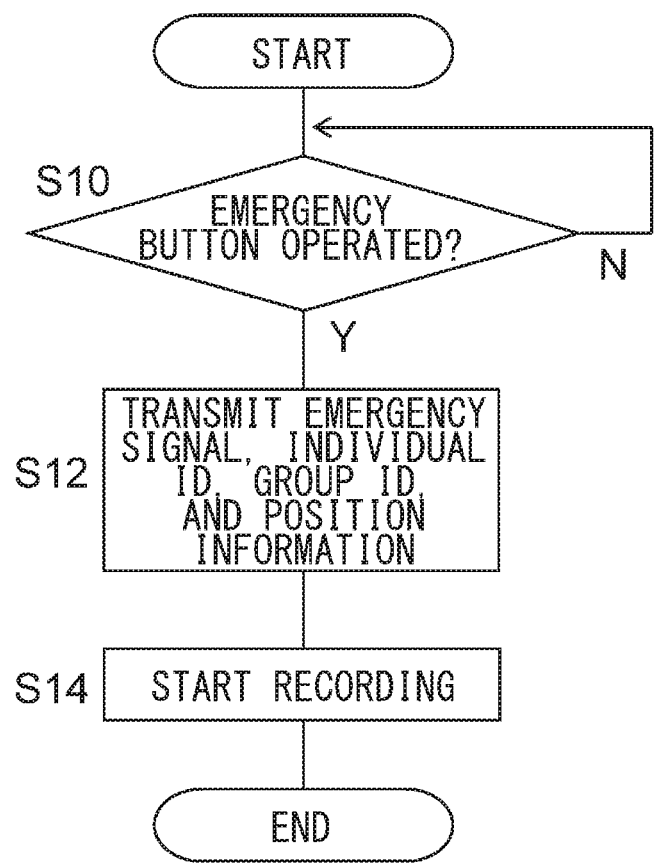
FIG. 10 is a flowchart illustrating an emergency signal transmission process of the terminal devices of FIG. 1.

FIG. 10 is a flowchart illustrating an emergency signal transmission process of the terminal devices 10 of FIG. 1. When the emergency button 16 is operated (Y in S10), the transmitter 42 transmits an emergency signal, the individual ID, the group ID, and the position information (S12). The control unit 38 causes a camera 20 that has been paired to start recording (S14). When the emergency button 16 is not operated (N in S10), the terminal device waits for the operation.

Figure 11:
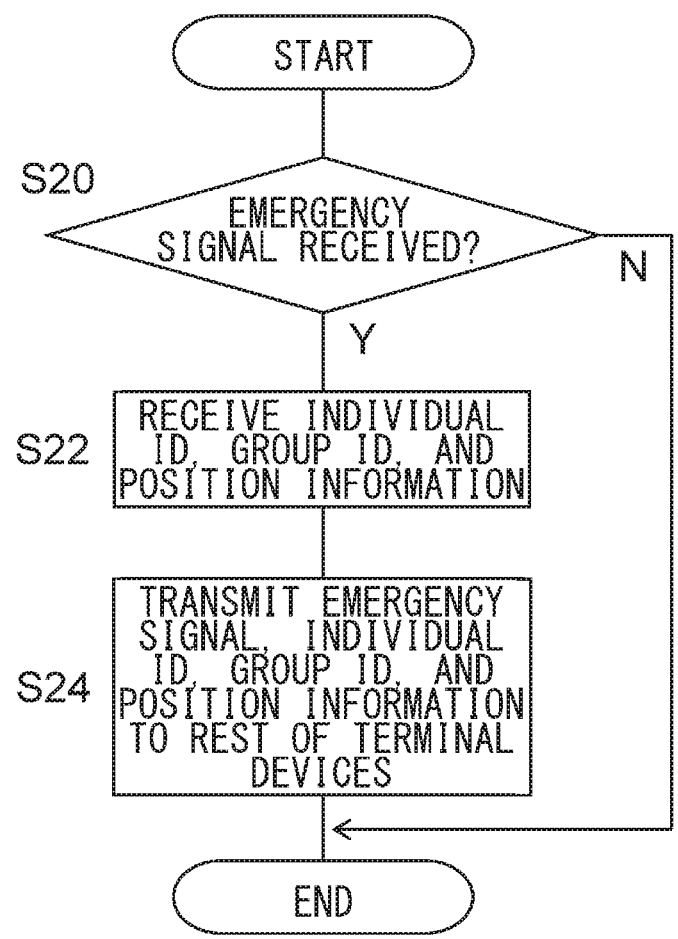
FIG. 11 is a flowchart illustrating an emergency signal reception and transmission process of the base station device of FIG. 1.

FIG. 11 is a flowchart illustrating an emergency signal reception and transmission process of the base station device 80 of FIG. 1. This process is performed on a regular basis. When the receiver 86 has received an emergency signal (Y in S20), the receiver 86 receives the individual ID, the group ID, and the position information (S22). The transmitter 88 transmits the emergency signal, the individual ID, the group ID, and the position information to the rest of the terminal devices 10 of the communication system 200 (S24). When the receiver 86 does not receive the emergency signal (N of S20), the process is ended.

Figure 12:
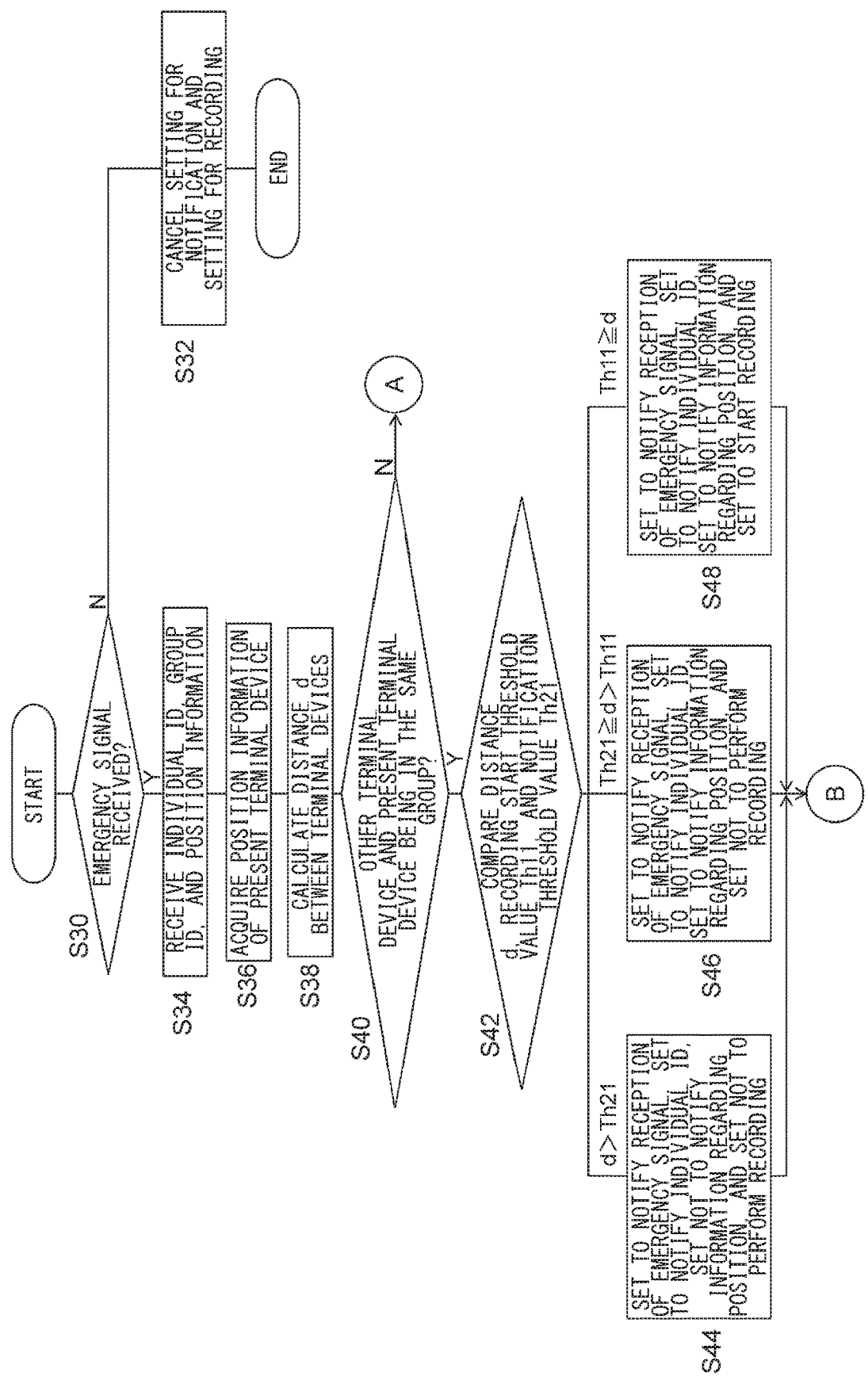
FIG. 12 is a flowchart illustrating an emergency signal reception process of the terminal devices of FIG. 1.

FIG. 12 is a flowchart illustrating an emergency signal reception process of the terminal devices 10 of FIG. 1. FIG. 12 shows, as an example, a process by a terminal device 10 in the Group A. This process is performed on a regular basis. When the receiver 46 is not receiving an emergency signal (N of S30), the setting unit 54 cancels the setting for notification and the setting for recording (S32) and ends the process. When the receiver 46 has received an emergency signal (Y in S30), the receiver 46 receives the individual ID of another terminal device 10 that is the transmission source for the emergency signal, the group ID of the other terminal device 10, and the position information of the other terminal device 10 (S34).

The positioning unit 40 acquires the position information of the present terminal device 10 (S36). The calculation unit 50 calculates the distance d between the other terminal device 10 and the present terminal device 10 (S38). When the other terminal device 10 and the present terminal device 10 are in the same group (Y in S40), the setting unit 54 compares the distance d, the recording start threshold value Th11, and the notification threshold value Th21 with one another (S42).

When the distance d is larger than the notification threshold value Th21, the setting unit 54 sets to notify the reception of an emergency signal, sets to notify the individual ID, sets not to notify information regarding the position of the other terminal device 10, and sets not to perform recording (S44).

Figure 13:
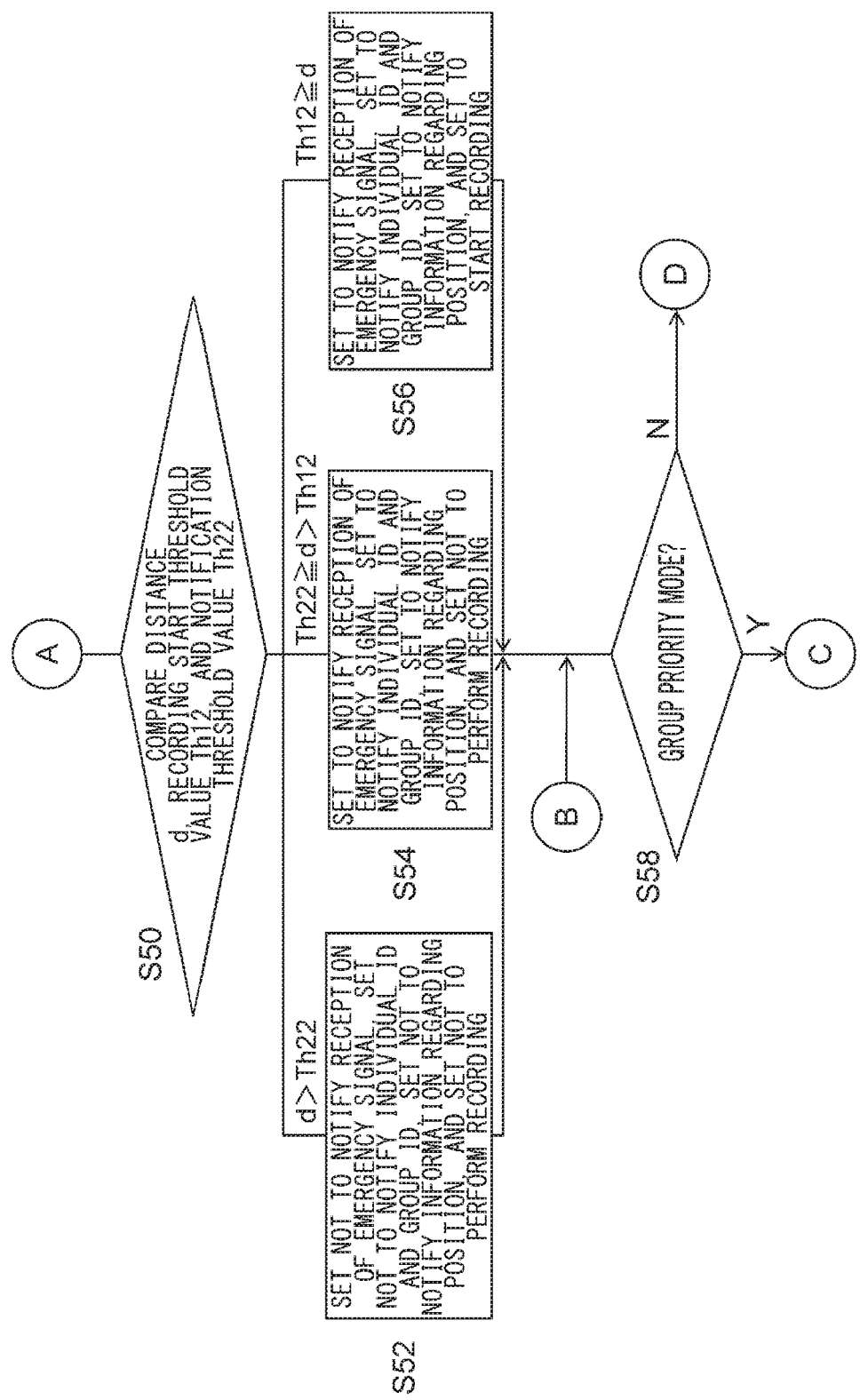
FIG. 13 is a flowchart illustrating an emergency signal reception process of the terminal devices of FIG. 1, following FIG. 12.

When the distance d is larger than the recording start threshold value Th11 and is less than or equal to the notification threshold value Th21, the setting unit 54 sets to notify the reception of an emergency signal, sets to notify the individual ID, sets to notify information regarding the position of the other terminal device 10, and sets not to perform recording (S46), and the step moves to a step S58 in FIG. 13.

When the distance d is less than or equal to the recording start threshold value Th11, the setting unit 54 sets to notify the reception of an emergency signal, sets to notify the individual ID, sets to notify the information regarding the position of the other terminal device 10, and sets to start recording (S48), and the step moves to the step S58 in FIG. 13.

On the other hand, when the other terminal device 10 and the present terminal device 10 are not in the same group (N in S40), the process in step S50 in FIG. 13 is performed.

FIG. 13 is a flowchart illustrating an emergency signal reception process of the terminal devices 10 of FIG. 1, following FIG. 12. The setting unit 54 compares the distance d, the recording start threshold value Th12, and the notification threshold value Th22 with one another (S50).

When the distance d is larger than the notification threshold value Th22, the setting unit 54 sets not to notify the reception of an emergency signal, sets not to notify the individual ID and the group ID, sets not to notify information regarding the position of the other terminal device 10, and sets not to perform recording (S52), and the step moves to the step S58.

When the distance d is larger than the recording start threshold value Th12 and is less than or equal to the notification threshold value Th22, the setting unit 54 sets to notify the reception of an emergency signal, sets to notify the individual ID and the group ID, sets to notify information regarding the position of the other terminal device 10, and sets not to perform recording (S54), and the step moves to a step S58.

When the distance d is less than or equal to the recording start threshold value Th12, the setting unit 54 sets to notify the reception of an emergency signal, sets to notify the individual ID and the group ID, sets to notify the information regarding the position of the other terminal device 10, and sets to start recording (S56), and the step moves to the step S58.

Figure 14:
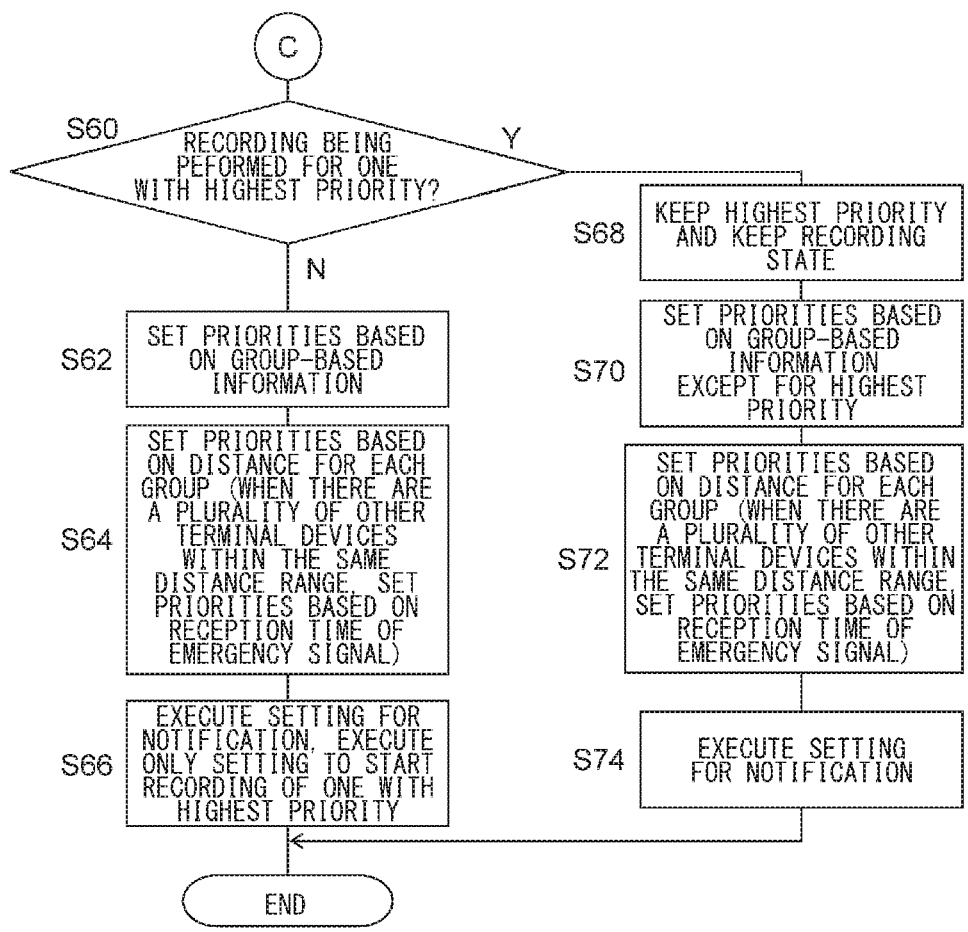
FIG. 14 is a flowchart illustrating an emergency signal reception process of the terminal devices of FIG. 1, following FIG. 13.

When the group priority mode has been set (Y in S58), the step moves to a step S60 in FIG. 14. When the group priority mode has not been set (N in S58), that is, when the distance priority mode has been set, the step moves to a step S80 in FIG. 15.

FIG. 14 is a flowchart illustrating an emergency signal reception process of the terminal devices 10 of FIG. 1, following FIG. 13. When the recording for the one with the highest priority is not being performed (N in S60), the setting unit 54 sets priorities for other terminal devices 10 based on the group-based information (S62).

For each group, the setting unit 54 sets priorities based on a distance, and when there are a plurality of other terminal devices 10 within the same distance range, the setting unit 54 sets priorities based on the reception time of an emergency signal (S64). The setting unit 54 executes the setting for notification, executes only the setting to start recording of the one with the highest priority (S66), and ends the process.

When the recording for the one with the highest priority is being performed (Y in S60), the setting unit 54 keeps the highest priority and keeps the state of the recording (S68). The setting unit 54 sets priorities for other terminal devices 10 based on the group-based information except for the highest priority (S70). For each group, the setting unit 54 sets priorities based on a distance, and when there are a plurality of other terminal devices 10 within the same distance range, the setting unit 54 sets priorities based on the reception time of an emergency signal (S72). The setting unit 54 executes the setting for notification (S74) and ends the process.

Figure 15:
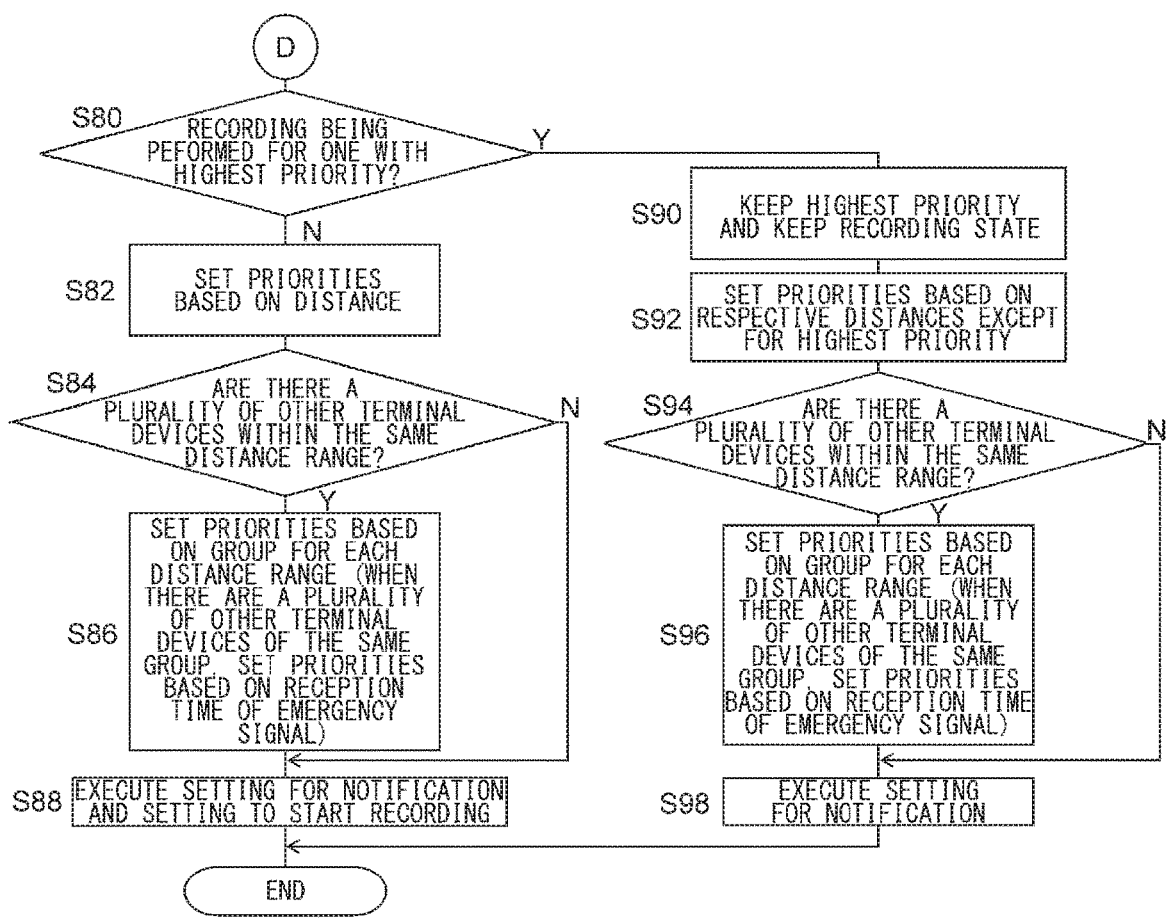
FIG. 15 is a flowchart illustrating an emergency signal reception process of the terminal devices of FIG. 1, following FIG. 13.

FIG. 15 is a flowchart illustrating an emergency signal reception process of the terminal devices 10 of FIG. 1, following FIG. 13. When the recording for the one with the highest priority is not being performed (N in S80), the setting unit 54 sets priorities for other terminal devices 10 based on the respective distances (S82).

When there are a plurality of other terminals devices 10 in the same distance range (Y in S84), the setting unit 54 sets, for each distance range, priorities based on the respective groups, and when there are a plurality of other terminal devices 10 of the same group, the setting unit 54 sets priorities based on the reception time of an emergency signal (S86). The setting unit 54 executes the setting for notification and the setting to start recording (S88) and ends the process. When there is not a plurality of other terminal devices 10 in the same distance range in the step S84 (N in S84), the step moves to a step S88.

When the recording for the one with the highest priority is being performed (Y in S80), the setting unit 54 keeps the highest priority and keeps the state of the recording (S90). The setting unit 54 sets priorities for other terminal devices 10 based on the respective distances except for the highest priority (S92).

When there are a plurality of other terminals devices 10 in the same distance range (Y in S94), the setting unit 54 sets, for each distance range, priorities based on the respective groups, and when there are a plurality of other terminal devices 10 of the same group, the setting unit 54 sets priorities based on the reception time of an emergency signal (S96). The setting unit 54 executes the setting for notification (S98) and ends the process. When there is not a plurality of other terminal devices 10 in the same distance range in the step S94 (N in S94), the step moves to a step S98.

According to the present embodiment, since the reception of information regarding a plurality of other terminal devices 10 and a plurality of emergency signals is notified based on priorities that have been set, the user can easily determine which reception of the emergency signal the user should respond based on the priorities. Therefore, the occurrence of an emergency situation can be properly notified when a plurality of terminal devices 10 receive emergency reporting.

In the group priority mode, since the priority for another terminal device 10 in a group that is the same as that of the present terminal device 10 is set to be higher, the user can easily recognize emergency reporting from the other terminal device 10 in the same group. Since the priorities for a plurality of other terminal devices 10 in a group that is the same as that of the present terminal device 10 are set based on the respective distances, the user can easily recognize emergency reporting from another terminal device 10 that is in the same group and located closest in the same group. Further, based on the times at which a plurality of emergency signals are received from a plurality of other terminal devices 10 in one distance range in one group, the priorities for the plurality of other terminal devices 10 are set; thus, the user can easily recognize newer emergency reporting among these.

In the distance priority mode, the priorities for a plurality of other terminal devices 10 are set based on the respective distances. Thus, the user can easily recognize emergency reporting by another terminal device 10 located closer regardless of the group. Further, since the priorities for a plurality of other terminal devices 10 whose respective distances are within the same distance range are set based on group-based information, the user can easily recognize emergency reporting from another terminal device 10 in the same group that is located within the same distance range. Further, based on the times at which emergency signals are received from a plurality of other terminal devices 10 in one group in one distance range, the priorities for the plurality of other terminal devices 10 are set; thus, the user can easily recognize newer emergency reporting among these.

In the group priority mode and the distance priority mode, when the camera 20 is caused to start recording, the priority for the other terminal device 10 that has triggered the start of the recording is maintained to be the highest even when a new emergency signal is received. Thus, emergency reporting by the other terminal device 10 can be kept being preferentially recognized by the user.

When having received an emergency signal from one terminal device 10 included in one group, the base station device 80 transmits the emergency signal that has been received to the rest of the terminal devices 10 included in the group and to terminal devices 10 other than those in the group; thus, emergency reporting can be made to the terminal devices 10 regardless of their groups. At this time, since the emergency signal is transmitted while maintaining the groups, communication can be performed within the group even when the emergency signal is transmitted. Therefore, in the event of an emergency, emergency reporting can be made to the terminal devices 10 regardless of their groups, and communication can be performed within the group.

Since the base station device 80 does not need to perform a process of changing the group or a process of forming a new group when transmitting an emergency signal, emergency reporting can be performed using a simple process.

When the base station device 80 has received, from one terminal device 10, position information indicating the position of this terminal device 10 in addition to an emergency signal, the base station device 80 also transmits this position information to the rest of the terminal devices 10 included in the group and to terminal devices 10 other than those in the group. Thus, the terminal devices 10 that have received the emergency signal can calculate the distance d to the terminal device 10 that is the transmission source for the emergency signal. Therefore, the terminal device 10 that has received the emergency signal can perform a proper process in accordance with the distance d in the event of an emergency.

When the base station device 80 has received, from one terminal device 10, group-based information of this terminal device 10 in addition to an emergency signal, the base station device 80 also transmits this group-based information to the rest of the terminal devices 10 included in the group and to terminal devices 10 other than those in the group. Thus, the terminal devices 10 that have received the emergency signal can perform a proper process in accordance with the groups in the event of an emergency.

When the base station device 80 has received, from one terminal device 10, identification information of this terminal device 10 in addition to an emergency signal, the base station device 80 also transmits this identification information to the rest of the terminal devices 10 included in the group and to terminal devices 10 other than those in the group. Thus, the terminal devices 10 that have received the emergency signal can notify the information for identifying the terminal device 10 that is the transmission source for the emergency signal in the event of an emergency.

When the present terminal device 10 receives an emergency signal from another terminal device 10 and the distance d is equal to or less than the recording start threshold value, the present terminal device 10 causes the camera 20 to start recording regardless of the group of the other terminal device 10, and the only camera 20 that is close to the imaging target thus starts recording. Thereby, unnecessary recording, by a camera 20 whose image capturing range does not include a person to be tracked, can be prevented.

If recording is started by a camera 20 of a user who is away from the imaging target and cannot head to help since the user is performing different work based on an order different from that of the user who made the emergency reporting, there is a risk that this user's behavior is disturbed. Since a camera 20 of such a user can be prevented from starting recording, it is possible to prevent the user's behavior from being disturbed. Therefore, in the event of an emergency, it is possible to cause the camera 20 to start recording properly.

When the present terminal device 10 receives an emergency signal from another terminal device 10 and the distance d is equal to or less than the notification threshold value, the present terminal device 10 notifies the user of the present terminal device 10 of information regarding the position of the other terminal device 10 regardless of the group of the other terminal device 10 and is therefore able to indicate the direction toward which the user should go and the direction of the imaging target. Therefore, it is possible to allow the user to act adequately for the emergency reporting. Also, it is possible to prevent a user, who is away from the imaging target and cannot head to help since the user is performing different work based on a different order, from being notified of information regarding the position of another terminal device 10. Thus, unnecessary notification can be suppressed.

When the present terminal device 10 has received an emergency signal from another terminal device 10, the present terminal device 10 gives notification of information for identifying the other terminal device 10 and the reception of the emergency signal when (1) the group of the other terminal device 10 is the same as the group of the present terminal device 10 or when (2) the group of the other terminal device 10 is different from the group of the present terminal device 10 and the distance d is equal to or less than the notification threshold value. Therefore, in the event of an emergency, notification of the reception of an emergency signal or the like can be made in a terminal device 10 with a high need for notification, and no notification of the reception of an emergency signal or the like can be made in a terminal device 10 with a low need for notification.

In the case where the present terminal device 10 notifies the reception of the emergency signal, if the group of the other terminal device 10 is different from the group of the present terminal device 10, the present terminal device 10 also gives notification of the group of the other terminal device 10; thus, the present terminal device 10 is capable of allowing the user of the present terminal device 10 who has been notified of the reception of the emergency signal to recognize the group of the other terminal device 10, which is the transmission source for the emergency signal. Therefore, the user of the present terminal device 10 who has been notified of the reception of the emergency signal can inform the group of the user having an emergency situation to the rest of the terminal devices 10 in the group through group communication. Further, even when the information for identifying the other terminal device 10 is the same as the information for identifying any one of the terminal devices 10 in the group of the present terminal device 10, the user can recognize that the other terminal device 10 belongs to a different group.

Since the other terminal device 10 also transmits the own position information periodically during the transmission of the emergency signal, even when both the user of the other terminal device 10 and the user of the present terminal device 10 are moving, the user of the present terminal device 10 can adequately approach the user of the other terminal device 10.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

For example, when the receiver 46 receives the emergency signal, if the group of the other terminal device 10 is different from the group of the present terminal device 10 and the distance d is equal to or less than the recording start threshold value, the notification unit 34 may notify the reception of the emergency signal, the information for identifying the other terminal device 10, and the group of the other terminal device 10. When the receiver 46 has received the emergency signal, if the group of the other terminal device 10 is different from the group of the present terminal device 10 and the distance d is larger than the recording start threshold value, the notification unit 34 may give no notification of the reception of the emergency signal, the information for identifying the other terminal device 10, and the group of the other terminal device 10. This process also corresponds to also giving notification of the group of the other terminal device 10 when the group of the other terminal device 10 is different from the group of the present terminal device 10 in the case where the notification unit 34 gives notification of the reception of the emergency signal. According to this variation, notification can be suppressed for users in a group different from the group of the other terminal device 10 in comparison with the embodiment.

Instead of the calculation of the linear distance, the calculation unit 50 may calculate the distance of a path from the present terminal device 10 to the other terminal device 10 based on the position information of the present terminal device 10, the position information of the other terminal device 10, and the map information of the map information storage unit 56. In this variation, the operation of the camera 20 can be controlled based on the distance of a path in which the user actually moves.

Although an explanation has been given of an example in which a terminal device 10 includes a positioning unit 40, a camera 20 may include a positioning unit, and the positioning unit may provide position information to the terminal device 10. Also, although an example in which information regarding the position of another terminal device 10 is displayed on a display unit 12 of a terminal device 10 has been explained, a camera 20 may include a display unit, and a notification unit 34 may allow the information regarding the position of the other terminal device 10 to be displayed on the display unit of the camera 20 so as to notify the user of the information via the display unit. According to these variations, the degree of freedom in the structure can be improved.

What is claimed is:

1. A terminal device comprising:
    a receiver that receives a plurality of signals from a plurality of other terminal devices;
    a setting unit that sets, when the receiver has received a plurality of emergency signals, priorities for the plurality of other terminal devices that are transmission sources for the plurality of emergency signals; and
    a notification unit that gives notification of information regarding the plurality of other terminal devices that have transmitted the plurality of emergency signals, based on the priorities that have been set by the setting unit,
    wherein the setting unit causes a camera connected to the terminal device to start recording when a distance between the terminal device and another terminal device with a highest priority is equal to or less than a predetermined recording start threshold value and maintains, when the setting unit has caused the camera to start recording, a priority for the another terminal device that has triggered the start of the recording to be the highest even when the receiver receives a new emergency signal.

2. The terminal device according to claim 1,
    wherein the receiver receives, from each of the plurality of other terminal devices, group-based information indicating a group to which the each of the plurality of other terminal devices belongs along with an emergency signal, and
    wherein the setting unit sets priorities based on the group-based information received by the receiver.

3. The terminal device according to claim 2, further comprising:
    a calculation unit that calculates a distance between the terminal device and each of the plurality of other terminal devices,
    wherein the setting unit sets priorities for the plurality of other terminal devices in a same group as that of the terminal device based on the distance calculated by the calculation unit.

4. The terminal device according to claim 1, further comprising:
    a calculation unit that calculates a distance between the terminal device and each of the plurality of other terminal devices,
    wherein the setting unit sets priorities for the plurality of other terminal devices based on the distance calculated by the calculation unit.

5. The terminal device according to claim 4,
    wherein the receiver receives, from each of the plurality of other terminal devices, group-based information indicating a group to which the each of the plurality of other terminal devices belongs along with an emergency signal, and
    wherein the setting unit sets priorities for the plurality of other terminal devices whose respective distances calculated by the calculation unit are within a same distance range, based on the group-based information received by the receiver.

6. A notification method in a terminal device, comprising:
    receiving a plurality of signals from a plurality of other terminal devices;
    setting, when having received a plurality of emergency signals in the receiving, priorities for the plurality of other terminal devices that are the transmission sources for the plurality of emergency signals; and
    giving notification of information regarding the plurality of other terminal devices that have transmitted the plurality of emergency signals, based on the priorities that have been set,
    wherein in the setting, causing a camera connected to the terminal device to start recording when a distance between the terminal device and another terminal device with a highest priority is equal to or less than a predetermined recording start threshold value and maintaining, when having caused the camera to start recording, a priority for the another terminal device that has triggered the start of the recording to be the highest even when a new emergency signal is received.

* * * * *